(12) United States Patent
Blex

(10) Patent No.: US 6,339,970 B1
(45) Date of Patent: Jan. 22, 2002

(54) TELESCOPIC STEERING COLUMN WITH A DEFORMATION BODY

(75) Inventor: Waldemar Blex, Aschaffenburg (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/425,843

(22) Filed: Oct. 21, 1999

(30) Foreign Application Priority Data

Oct. 26, 1998 (DE) .......................................... 198 49 262

(51) Int. Cl.⁷ ................................................. B62D 1/18
(52) U.S. Cl. .......................... 74/492; 188/371; 280/777; 403/2
(58) Field of Search .................... 74/492, 493; 280/775, 280/777; 188/371; 411/4; 403/2, DIG. 3; 285/2

(56) References Cited

U.S. PATENT DOCUMENTS

| | | | | |
|---|---|---|---|---|
| 3,864,988 A | * | 2/1975 | Adams, III .................. | 74/492 |
| 4,117,741 A | * | 10/1978 | Yazane et al. ................ | 74/492 |
| 4,177,352 A | * | 12/1979 | Dunbar et al. .............. | 403/2 X |
| 4,183,258 A | * | 1/1980 | Stephan ........................ | 74/492 |
| 4,184,408 A | * | 1/1980 | Smith et al. ............ | 403/292 X |
| 5,567,096 A | * | 10/1996 | Howard ....................... | 410/42 |

* cited by examiner

*Primary Examiner*—Allan D. Herrmann
(74) *Attorney, Agent, or Firm*—Martin A. Farber

(57) ABSTRACT

In a steering column (1) which is telescopic in the event of a crash, an outer column tube (6) is connected to a stem (7) by means of a shearing body (10). This two-piece shearing body (10) has a shearing area which is reduced relative to its external dimensions and is determined by a projection connecting its two sections (11, 12). The shearing body (10) can therefore absorb relatively large axial forces, for example for assembly purposes, and yet permits maximum admissible shearing forces which can be set largely as desired and which at the same time can be reproduced with high accuracy.

23 Claims, 4 Drawing Sheets

TELESCOPIC STEERING COLUMN WITH A DEFORMATION BODY

FIELD AND BACKGROUND OF THE INVENTION

The invention relates to a telescopic steering column, in particular for a motor vehicle, having an outer column tube and a stem, the column tube and the stem being connected by means of a deformation body.

Such steering columns are frequently used in modern motor vehicles and are thus known. In this case, the deformation body prevents the deformation forces which act on the vehicle in the event of an accident from reacting on the driver. In particular, an axial displacement of the steering column into the passenger space is prevented. In some embodiments, the deformation body is also used to keep the risk of injury as small as possible in the event of the driver hitting the steering wheel.

To this end, the deformation body is provided, for example, with a predetermined breaking or tearing point, which enables the stem to be pushed telescopically into the outer column tube as soon as a predetermined maximum force is exceeded. In this case, the stem and the outer column tube are firmly connected to one another in normal driving operation. To this end, the deformation body, according to a known configuration, is made as a tear strap, the stem being torn open to the outside in the event of an excessive action of force.

A disadvantage with deformation bodies designed in such a way is that adaptation to the desired deformation forces involves considerable outlay and to this end, reconstruction of the steering column is usually necessary. Furthermore, inadvertent tearing of the deformation body in normal driving operation must be reliably avoided and at the same time reliable separation of stem and column tube above the admissible value must be ensured. At the same time, even slight production tolerances have an adverse effect on the operating reliability of the steering pillar. Therefore, many steering columns used in practice have a deformation body in which deformation is not effected until the action of a relatively large external force and the driver is thus subjected to high loading.

The problem underlying the invention is to provide, a steering column of the type mentioned at the beginning in such a way that this steering column permits reliable transmission of the steering forces in normal driving operation and at the same time prevents transmission of external forces to the driver above a value which can be freely set. In this case, production tolerances are at the same time to have no effects or only insignificant effects on the operating reliabilty, and the assembly process as well as the adaptation to various intended uses are to be facilitated.

SUMMARY OF THE INVENTION

This problem is solved according to the invention in that the deformation body has a shearing body, which has a shearing area differing from its cross-sectional area. In this way, it is possible to reliably connect the column tube and the stem by means of the shearing body and at the same time establish a desired, maximum transmittable force by adaptation of the shearing area. In this case, the shearing body may in particular have dimensions which permit a simple and perfect connection in the assembly process. As a result, for example, production processes which have comparatively high tolerance values or require specific shaping of the shearing body may also be used. The adaptation of the desired shearing forces permits universal use of the shearing body in different vehicles.

An especially advantageous development of the invention is provided by virtue of the fact that the shearing body, in its installed position, in the region between the column tube and the stem, has a shearing area reduced relative to the remaining cross-sectional area. As a result, the shearing body can have a cross-sectional area designed in accordance with the steering forces to be transmitted and to this end may also be provided, for example, with a thread or a special profile, the shearing body having a reduced shearing area which is independent thereof.

An especially favorable development of the invention is also provided when the shearing body has two sections, which are connected to one another in a positive-locking manner by means of a shearing pin determining the shearing area. By the division of the shearing body into two sections, the forces acting in the parting plane are transmitted solely by the shearing pin. In this case, the two sections bear directly against one another and thus permit transmission of virtually unchanged thrust forces in the plane transversely to the parting plane. As a result, the shearing body designed in such a way may also be driven into the steering pillar with a relatively large force. In this case, the first section is connected to the outer shaped body and the second section is connected to the stem.

In this case, the shearing pin may have any desired dimensions and different material properties and may be connected to the two sections in a detachable or fixed manner. An especially expedient connection is also provided by virtue of the fact that the shearing pin has a press fit. In this way, the two sections of the shearing body may first of all be joined together to form a construction unit, so that the subsequent production process is substantially facilitated. In the process, the shearing force can at the same time also be determined in a precise and reliable manner and incorrect assembly can be prevented.

An especially simple embodiment of the invention is also provided by virtue of the fact that the shearing body has a first section, which is provided with a projection and is inserted into a corresponding recess of a second section. In this way, the assembly process can be further simplified by virtue of the fact that the shearing body consists of only two parts. In this case, different configurations for facilitating the assembly may be provided, in which case, for example, the external dimensions are standardized even in the case of different shearing areas.

The invention is configured in an especially simple manner in that the shearing body has a core, which can be removed after the insertion of the shearing body into the steering column.

To this end, during the assembly process, the shearing body may be designed in particular as a solid shaped part, which in this way permits problem-free production and the transmission of high assembly forces. After the subsequent removal of the core, which to this end, for example, is specifically inserted beforehand into the shearing body, the cross-sectional area is reduced to the desired shearing area. Embodiments in which the core of the shearing body is removed by any desired processing, for example by machining, are just as conceivable as the use of a core provided with differing material properties. The core may also be designed as part of a tool and as a result may be inserted into the hearing body merely during the assembly process.

An especially effective modification of the invention is provide by virtue of the fact that the shearing body has a least one aperture reducing the cross-sectional area to the size of the shearing area. Such an aperture is easy to make and thus permits a rapid adaptation to he admissible shearing forces.

It is also especially advantageous if the shearing body has an essentially circular cross-sectional area. In this way, assembly errors can be largely eliminated. At the same time, notch effects due to edges on the shearing body and the associated effects on the admissible sharing stress can be prevented.

An especially suitable embodiment of the invention is also provided by virtue of the fact that the steering column has a plurality of shearing bodies distributed approximately uniformly over the circumference. Possible influences due to bending moments on the shearing body can thereby be largely avoided. In this case, a plurality of the shearing bodies may also be combined to form a construction unit, or a shearing body may have a plurality of shearing areas distributed over the circumference.

It is favorable in this connection if the shearing body is made of steel. As a result, the material properties the shearing body designed in such a way can also be adapted to high loads. At the same time, the sharing body is insensitive to temperature fluctuations and corrosion.

The outer column tube and the stem may be inserted into one another in a positive-locking manner, so that a rotary movement relative to one another is limited so as to be small or is completely ruled out. However, it is especially advantageous if the outer column tube and the stem are connected in a rotationally locked manner merely by means of the shearing body. As a result, in the event of an excessive action of force on the steering column, transmission of axial and radial forces is prevented. The passive safety of the driver is thereby substantially increased.

BRIEF DESCRIPTION OF THE DRAWINGS

The invention permits various embodiments. For further clarification of its basic principle, several embodiments are described are in the drawings, in which.

DETAILED DESCRIPTION OF THE PREFERRED EMBODIMENT

Figure 1:
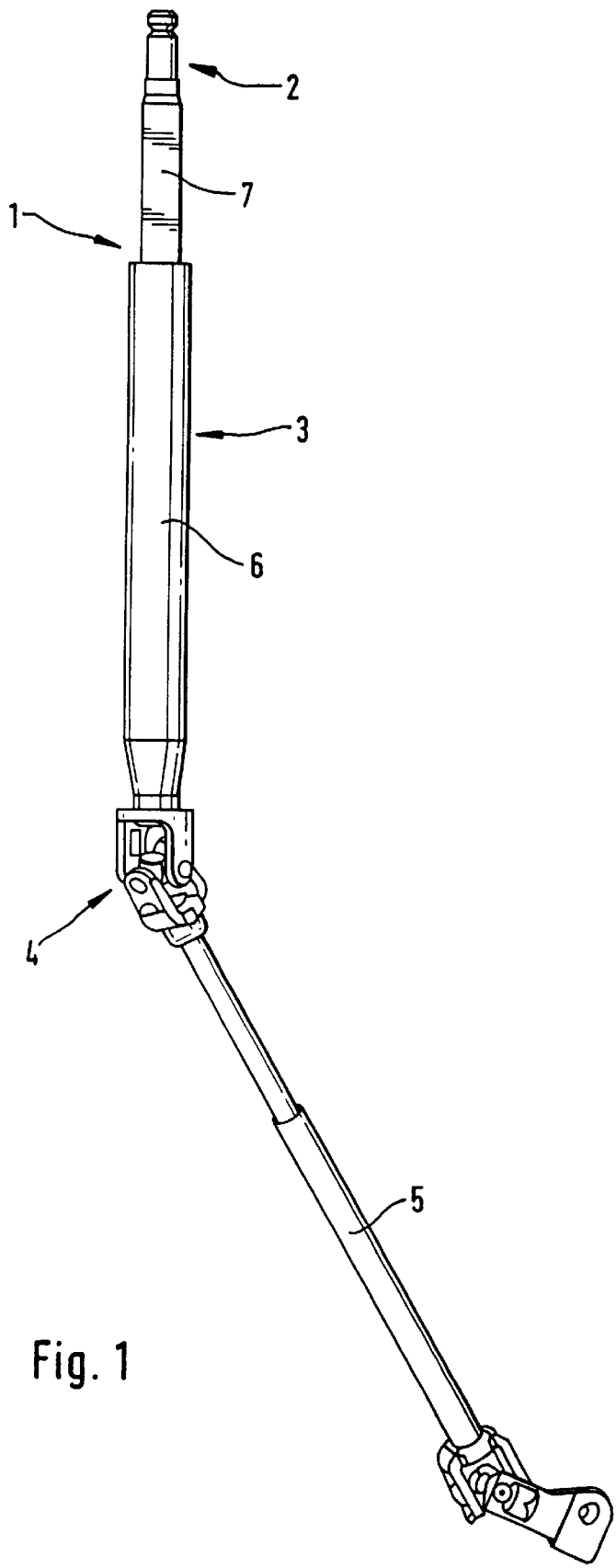
FIG. 1 shows a perspective view of a steering column.

FIG. 1, in a perspective view, shows a two-piece steering column 1 of a motor vehicle, whose top part 3, provided with a steering-wheel mounting 2, is connected to a bottom part 5 by means of a universal joint 4. The top part 3 of the steering column 1 has a column tube 6, into which a stem 7 can be telescopically pushed in the event of a crash. A force acting on the steering column 1 from outside and exceeding the admissible value is therefore not transmitted to the steering-wheel mounting 2 and thus not to the driver of a vehicle equipped with the steering column 1 but causes the stem 7 to be pushed into the column tube 6.

Figure 2:
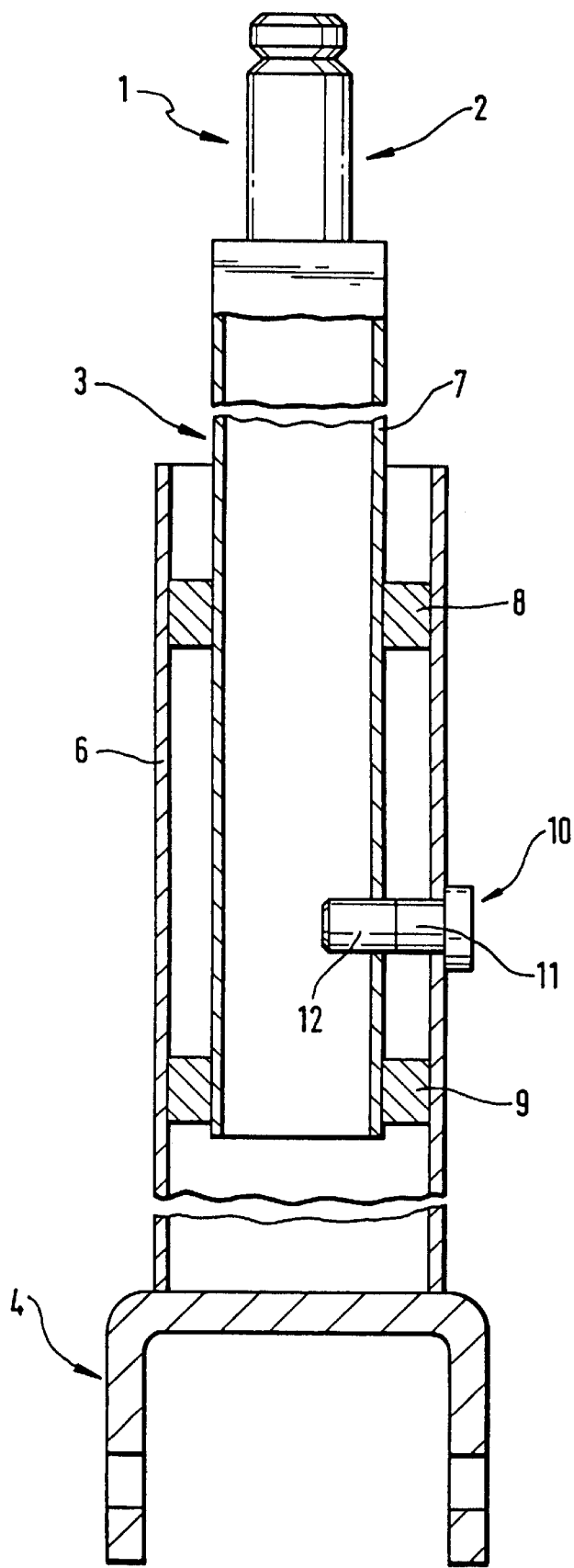
FIG. 2 shows a longitudinal section through a top section of the steering column with a column tube and a stem.

FIG. 2 shows a truncated representation, sectioned along its longitudinal axis, of the top part 3 of the steering column 1. The stem 7 connected to the steering-wheel mounting 2 can be seen, and this stem 7 is partly pushed into the column tube 6 connected to the universal joint 4. One guide 8, 9 each determines the distance between the column tube 6 and the stem 7, so that jamming of the stem 7 in the column tube 6 can be ruled out, even in the event of a bending load. In the operating state shown a shearing body 10 passed through both the wall of the column tube 6 and the stem 7 prevents their unintentional relative movement. When a force which is above a maximum admissible, external loading acts on the steering column 1, the shearing body 10 is separated between a first section 11 bearing against the column tube 6 and a second section 12 inserted into the stem 7, so that the stem 7 and the column tube 6 can be pushed telescopically into one another.

Figure 3:
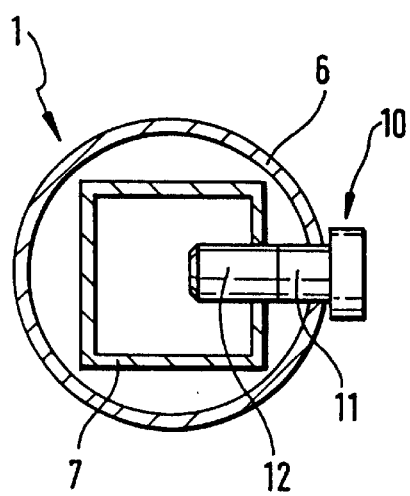
FIG. 3 shows a cross section through the column tube and the stem.
Figure 2A:
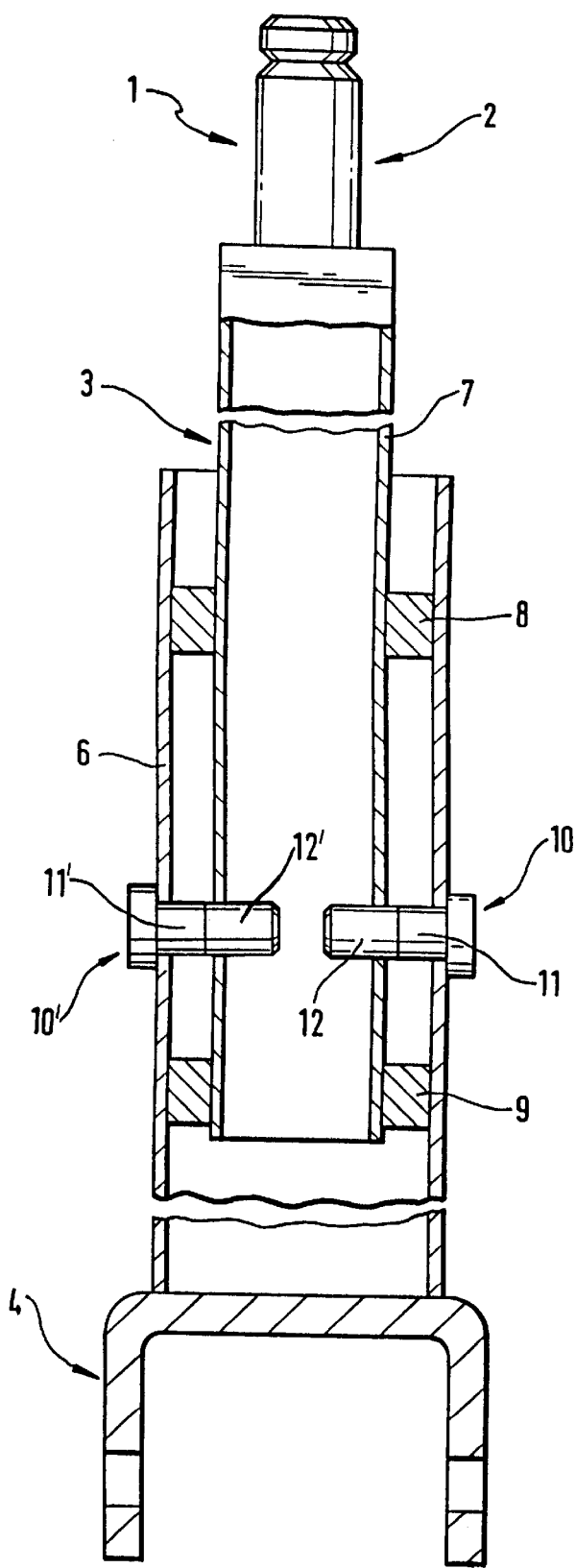
FIG. 2a shows another longitudinal section through a top section of the steering column with a column tube and a stem.
Figure 5A:
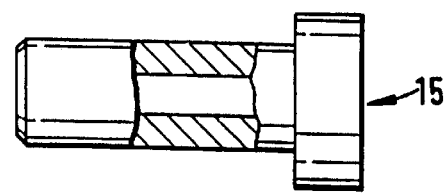
FIG. 5a shows the same partly sectioned side view of a shearing body as FIG. 5 with he core of the shearing body removed.

FIG. 3 shows a cross section through the column tube 6 and the stem 7. The shearing body 10 is inserted into the steering column 1 in such a way that the first section 11 of the shearing body 10 projects through the column tube 6 and the second section 12 of the shearing body 10 projects into the stem 7, which is likewise made as a hollow body. In this case, shearing of the shearing body 10 permits both an axial displacement and rotatability of the column tube 6 and the stem 7 relative to one another. To install the shearing body 10, this shearing body 10, due to its high axial loading capacity, may be driven directly through the wall of the stem 7 and the column tube 6 without having to provide a corresponding aperture beforehand in stem 7 and/or column tube 6.

Figure 4:
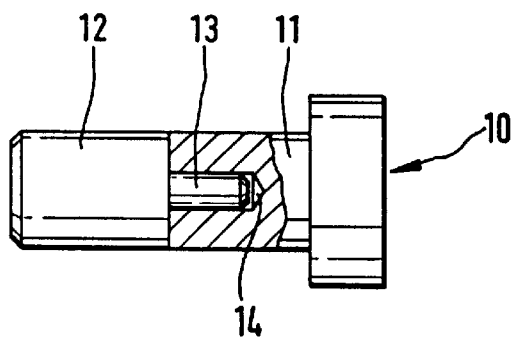
FIG. 4 shows in a shearing body of the steering column in a partly sectioned side view.

FIG. 4 shows the shearing body 10 in an enlarged and partly sectioned side view. The two-piece design of the shearing body 10 can be seen, the second section 12 having a projection 13, which is inserted by means of a press fit into a corresponding recess 14 of the first section 11. A shearing stress acting transversely to the longitudinal axis of the shearing body 10 is therefore transmitted only to the projection 13. The cross-section al area of the projection 13 can be adapted without problems to various intended uses. In this case, the configuration of the projection 13 only has a marginal effect on the axial loading capacity of the shearing body 10. The external dimensions of the shearing body 10 may therefore be optimally matched, for example, to the desired production processes or design requirements and may in particular also be selected in such a way that the shearing body 10 may be driven with a large force through the stem 7 and the column tube 6.

Figure 5:
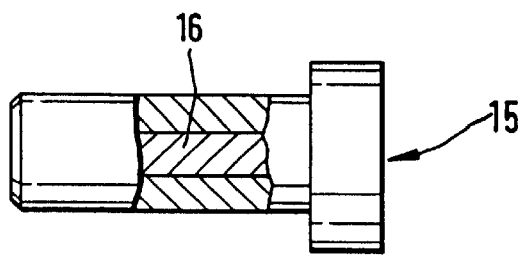
FIG. 5 shows another embodiment of a shearing body according to the invention in a partly sectioned side view.

FIG. 5, in a partly sectioned side view, shows an embodiment of a shearing body 15, this embodiment being modified compared with FIG. 4. In this case, the shearing body 15 has a core 16, which, in the state shown, to begin with not yet inserted into a steering column, is inserted without gaps into the shearing body 15 over the full length of the latter. After completion of the manufacturing process, the core 16 can be removed from the shearing body 15, so that the shearing area is formed merely by the remaining marginal region of the shearing body 15. In his case, other designs are also possible in which the core 16 is made as part of a tool (not shown) and can therefore be inserted into the shearing body 15 merely during the assembly process and can subsequently be reused. Furthermore, the core 16 may also be a section which to begin with is connected in one piece to the shearing body 15 and is removed, for example after the insertion into a steering column, by drilling or another cutting production process.

Figure 6:
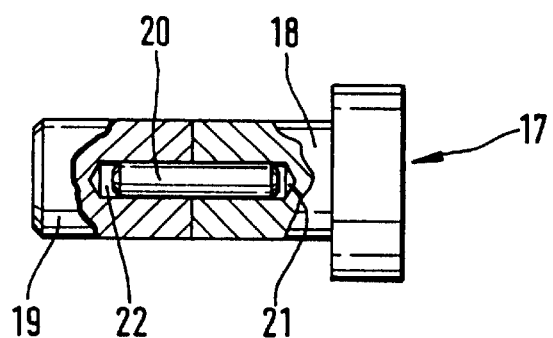
FIG. 6 shows a further embodiment of a two-piece shearing body a shearing pin in a partly sectioned side view.

FIG. 6 shows a two-piece embodiment of a shearing body 17, the two sections 18 and 19 of which are connected by mean of a shearing pin 20 determining the shearing area. To this end, the two sections 18, 19 each have a recess 21, 22, into which the shearing pin 20 is inserted with a press fit. In this embodiment, the maximum admissible sharing stress can be determined in a simple manner by selecting a suitable shearing pin 20 having the desired material properties. To this end, the shearing pin 20 may also be screwed, for example, into the recesses 18, 19.

Figure 7:
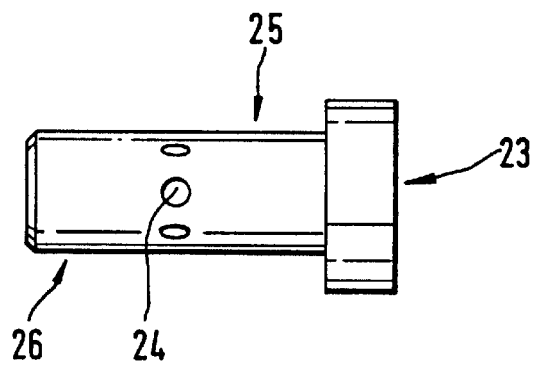
FIG. 7 shows a one-piece embodiment of a shearing body in a side view.

FIG. 7 shows a simple design of a shearing body 23. In this case, the one-piece shearing body 23 has a plurality of apertures 24, which are designed as bores and thus form predetermined breaking point for a force acting transversely to the longitudinal axis of the shearing body 23 the shearing area, determining the admissible shearing stress, of this predetermined breaking point being determined by the remaining cross-sectional area. To this end, in an assembled state, a first section 25 is inserted into a column tube (not shown) and a second section 26 is inserted into a stem (not shown). The apertures 24 may thereby be adapted without problems to the respective intended use.

What is claimed is:

1. A telescopic steering column having an outer column tube and a stem, the column tube and the stem being connected by a deformation body, wherein the deformation body has a sharing body (10, 15, 17, 23), which has a shearing area differing from its cross-sectional area.

2. The steering column as claimed in claim 1, wherein the shearing body (10, 15, 17, 23), in its installed position, in the region between the column tube (6) and the stem (7), has the shearing area reduced relative to the remaining cross-sectional area.

3. The steering column as claimed in claim 1, wherein the shearing body (17) has two sections (18, 19), which are connected to one another in a positive-locking manner by a shearing pin (20) determining the shearing area.

4. The steering column as claimed in claim 3, wherein the shearing pin (20) has a press fit.

5. The steering column as claimed in claim 1, wherein the shearing body (10) has a first section (12), which is provided with a projection (13) and is inserted into a corresponding recess (14) of a second section (11).

6. The steering column as claimed in claim 1, wherein the shearing body (15) has a core (16), which is removable after insertion of the shearing body (15) into the steering column (1).

7. The steering column as claimed in claim 1, wherein the shearing body (10, 15, 17, 23) has an essentially circular cross-sectional area.

8. The steering column as claimed in claim 1, wherein the steering column (1) has a plurality of shearing bodies (10, 15, 17, 23) distributed approximately uniformly over the circumference.

9. The steering column as claimed in claim 1, wherein the shearing body (10, 15, 17, 23 is made of steel.

10. The steering column as claimed in claim 1, wherein the outer column tube (6) and the stem (7) are connected in a rotationally locked manner merely by the shearing body (10, 15, 17, 23).

11. The steering column as claimed in claim 1, wherein the steering column is for a motor vehicle.

12. The steering column as claimed in claim 1, wherein said shearing body (10, 15, 17, 23) has a uniform cross-sectional area of the shearing body (10, 15, 17, 23).

13. The steering column as claimed in claim 1, wherein a predetermined shearing plane is formed in said shearing body (10, 15, 17, 23), wherein shearing of the shearing body (10, 17, 23) reliably occurs substantially only at said hearing plane under sufficient loading.

14. A telescopic steering column for a motor vehicle having an outer column tube and a stem, the column tube and the stem being connected by a deformation body, wherein the deformation body has a shearing body (10, 15, 17, 23), which has a shearing area differing from its cross-sectional area, wherein the shearing body (23) has at least one aperture (24) reducing the cross-sectional area to the size of the shearing area.

15. The steering column as claimed in claim 14, wherein the shearing body (10, 15, 17, 23), in its installed position, in the region between the column tube (6) and the stem (7), has he shearing area reduced relative to the remaining cross-sectional area.

16. The steering column as claimed in claim 14 wherein the shearing body (17) has two sections (18, 19), which are connected to one another in a positive-locking manner by a shearing pin (20), said shearing pin (20) determining the shearing area.

17. The steering column as claimed in claim 16, wherein the shearing pin (20) has a press fit.

18. The steering column as claimed in claim 14, wherein the shearing body (10) has a first section (12), which is provided with a projection (13) and is inserted into a corresponding recess (14) of a second section (11).

19. The steering column as claimed in claim 14, wherein the shearing body (15) has a core (16), which is removable after insertion of the shearing body (15) into the steering column (1).

20. The steering column as claimed in claim 14, wherein the shearing body (10, 15, 17, 23) has an essentially circular cross-sectional area.

21. The steering column as claimed in claim 14, wherein the steering column (1) has a plurality of shearing bodies (10, 15, 17, 23) distributed approximately uniformly over the circumference.

22. The steering column as claimed in claim 14, wherein the shearing body (10, 15, 17, 23) made of steel.

23. The steering column as claimed in claim 14, wherein the outer column tube (6) and the stem (7) are connected in a rotationally locked manner merely by the shearing body (10, 15, 17, 23).

\* \* \* \* \*